US007269198B1

(12) United States Patent
Elliott et al.

(10) Patent No.: US 7,269,198 B1
(45) Date of Patent: Sep. 11, 2007

(54) SYSTEMS AND METHODS FOR BEACONING IN WIRELESS NETWORKS WITH LOW PROBABILITY OF DETECTION

(75) Inventors: Brig Barnum Elliott, Arlington, MA (US); Warner George Harrison, Medfield, MA (US)

(73) Assignee: BBN Technologies Corp., Cambridge, MA (US)

( * ) Notice: Subject to any disclaimer, the term of this patent is extended or adjusted under 35 U.S.C. 154(b) by 1057 days.

(21) Appl. No.: 10/022,083

(22) Filed: Nov. 19, 2001

(51) Int. Cl.
*H04B 1/00* (2006.01)

(52) U.S. Cl. .................. 375/130; 370/335; 370/338; 370/479; 370/349; 370/465; 370/252; 370/254; 455/561; 455/66.1; 455/7

(58) Field of Classification Search .......... 375/130; 370/335, 338, 479, 349, 465, 252, 254, 351, 370/255; 455/561, 66.1, 7; 700/65
See application file for complete search history.

(56) References Cited

U.S. PATENT DOCUMENTS

| 5,541,912 | A |   | 7/1996  | Choudhury et al. |         |
|-----------|---|---|---------|------------------|---------|
| 5,649,119 | A |   | 7/1997  | Kondoh et al.    |         |
| 5,850,592 | A | * | 12/1998 | Ramanathan       | 455/7   |
| 6,000,011 | A |   | 12/1999 | Freerksen et al. |         |
| 6,067,301 | A |   | 5/2000  | Aatresh          |         |
| 6,094,435 | A |   | 7/2000  | Hoffman et al.   |         |
| 6,134,422 | A | * | 10/2000 | Bobadilla et al. | 455/561 |
| 6,218,931 | B1| * | 4/2001  | Asghar et al.    | 370/479 |
| 6,272,567 | B1|   | 8/2001  | Pal et al.       |         |
| 6,456,599 | B1| * | 9/2002  | Elliott          | 370/254 |
| 6,721,273 | B1|   | 4/2004  | Lyon             |         |
| 6,766,143 | B1| * | 7/2004  | Beckwith         | 455/66.1|
| 6,865,169 | B1| * | 3/2005  | Quayle et al.    | 370/335 |
| 6,977,895 | B1|   | 12/2005 | Shi et al.       |         |
| 2002/0018448 | A1 | * | 2/2002  | Amis et al.    | 370/255 |
| 2002/0035404 | A1 | * | 3/2002  | Ficco et al.   | 700/65  |
| 2002/0071395 | A1 | * | 6/2002  | Redi et al.    | 370/252 |
| 2002/0163933 | A1 | * | 11/2002 | Benveniste     | 370/465 |
| 2002/0191573 | A1 | * | 12/2002 | Whitehill et al.| 370/338|
| 2003/0128690 | A1 | * | 7/2003  | Elliott et al. | 370/351 |
| 2004/0196822 | A1 | * | 10/2004 | Proctor        | 370/349 |

OTHER PUBLICATIONS

History of Ultra Wideband Communications and Radar: Part I, UWB Communications; Terence W. Barrett; Microwave Journal; Jan. 2001; pp. 1-21.
History of Ultra Wideband Communications and Radar: Part II, UWB Radars and Sensors; Terence W. Barrett; Microwave Journal; Feb. 2001; pp. 1-16.

* cited by examiner

*Primary Examiner*—Chieh M. Fan
*Assistant Examiner*—Sudhanshu C. Pathak
(74) *Attorney, Agent, or Firm*—Fish & Neave IP Group Ropes & Gray LLP

(57) ABSTRACT

Systems and methods for performing neighbor discovery in a network (100) including a number of nodes are provided. A first node (110) in the network (100) generates a spread signal for alerting other nodes in the network (100) of the presence of the first node (110). The first node (110) broadcasts the signal and a second node (120) receives the signal and calculates an energy associated with the received signal. The second node (120) also determines whether the energy is greater than a threshold and identifies the first node (110) as a neighbor node when the energy is greater than the threshold.

18 Claims, 5 Drawing Sheets

SYSTEMS AND METHODS FOR BEACONING IN WIRELESS NETWORKS WITH LOW PROBABILITY OF DETECTION

BACKGROUND OF THE INVENTION

1. Field of the Invention

The present invention relates generally to networks and, more particularly, to systems and methods for detecting the presence of nodes in wireless networks.

2. Description of Related Art

The use of ad hoc wireless networks has increased in recent years. An ad hoc wireless network typically includes several wireless, sometimes mobile, nodes. In such a network, all of the nodes may be equipped with wireless communications transceivers. Some of the nodes (e.g., routers) may be designed to perform network routing functions while other nodes may be merely sources or destinations for data traffic.

All of the nodes in the network may execute a set of algorithms and perform a set of networking protocols that enable the nodes to find each other and determine paths through the network for data traffic from source to destination(s). The algorithms/protocols also enable the nodes to detect and repair ruptures in the network as nodes move, as nodes fail, as battery power changes, as communications path characteristics change over time, and so forth.

Conventional ad hoc wireless networks employ "beacons" as a way in which network nodes can perform neighbor discovery (i.e., locate other nearby nodes). A beacon is a transmission that can be generated by one node and received by some or all of the nodes within a transmission range. In other words, the beacon is a broadcast, rather than a transmission to any particular node. In some networks, all of the nodes may beacon, while in other networks, only a subset of the nodes may beacon. Beacons serve to alert a given receiving node that there may be one or more other (i.e., transmitting) nodes in their proximity.

Beacons typically include an identification of the node that is transmitting the beacon, forward error correction information, and other information based on the type of wireless networking protocols being employed. In conventional practices, the intent of beaconing is to ensure that other network nodes have the highest feasible chance of receiving the beacons, so that the nodes in the ad hoc network can form neighbor relationships and transmit data through the network. As a result, beacons are typically sent at regular intervals at the highest power level possible and include a fairly large number of bits of information content.

This combination of factors, however, makes it extremely easy for an adversary to detect the beacons. The adversary may also perform direction finding on the beacon transmissions to detect the actual physical locations of the wireless network nodes. The adversary may then attempt to physically attack one or more of the nodes in the network based on information gained from detecting the beacons and determining the location of the node(s). In addition, by knowing the network layout, the adversary may be able to eavesdrop on radio transmissions in the network more easily. The adversary may then try to use this information to access confidential information from the network.

Therefore, a need exists for systems and methods that enable nodes to perform neighbor discovery with a low probability of detection.

SUMMARY OF THE INVENTION

Systems and methods consistent with the present invention address this and other needs by splitting the neighbor discovery function into two sub-functions: 1) a very low probability of detection (LPD) "proximity alert" function, and 2) an "exchange of information" function. The nodes may first discover that other nodes are nearby via the proximity alert function. The nodes may then exchange useful information using, for example, directional antennas.

In accordance with the principles of the invention as embodied and broadly described herein, a method of performing neighbor discovery in a wireless network including a plurality of nodes is provided. The method includes generating a signal at a first node for alerting other nodes in the network of the presence of the first node, where the signal comprises a spread signal. The method also includes broadcasting the signal from the first node, receiving the signal at a second node and calculating an energy associated with the received signal. The method further includes determining whether the energy is greater than a threshold and identifying the first node as a neighbor node when the energy is greater than the threshold.

In another implementation consistent with the present invention, a computer-readable medium having stored sequences of instructions is provided. The instructions cause a processor to retrieve a spreading sequence that identifies a first node in a wireless network and broadcast the spreading sequence. The instructions also cause the processor to receive a message from a second node in the wireless network, where the message identifies the second node and indicates that the second node is a neighbor node.

In a further implementation consistent with the present invention, a first node is provided in a network that includes a plurality of nodes. The first node includes at least one antenna configured to receive a signal from a second one of the nodes over a period of time and a filtering device configured to filter the received signal. The first node also includes a processing device coupled to the filtering device. The processing device is configured to receive the filtered signal, calculate an energy associated with the filtered signal and determine whether the energy exceeds a threshold.

In still another implementation consistent with the present invention, a first node in a wireless network is provided. The first node includes an omni-directional antenna, a transmitter and a receiver. The transmitter is configured to transmit a signal for alerting other nodes in the network of the presence of the first node via the omni-directional antenna. The signal includes a spread signal that is spread using a direct sequence, a frequency hopping sequence or a number of short pulses. The receiver is configured to receive a message from a second node, where the message identifies the second node as a neighbor node and is sent in response to the second node detecting the signal from the first node.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention perform beaconing by transmitting long spreading sequences at low power levels. This enables a wireless network to reduce the likelihood that an unintended receiver will be able to detect the beacon messages transmitted from nodes performing neighbor discovery.

Exemplary Network

Figure 1:
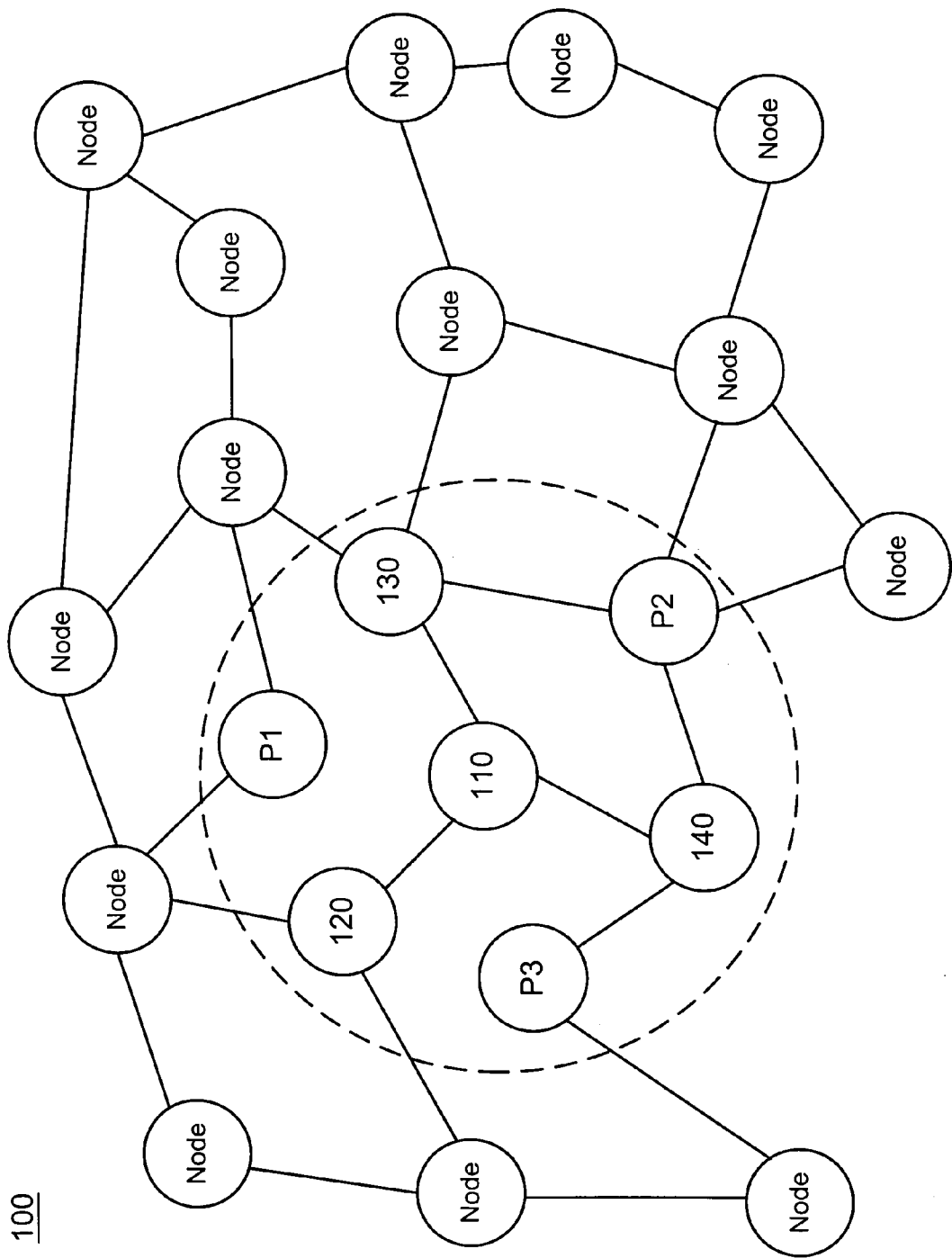
FIG. 1 is an exemplary diagram of a network in which systems and methods consistent with the present invention may be implemented.

FIG. 1 is a diagram of an exemplary network 100 in which systems and methods consistent with the present invention may be implemented. Each of the circles represents a node and each of the nodes may communicate with neighboring nodes via radio frequency (RF) communication paths or links. The solid lines connecting the nodes represent "neighbor relations" between nodes (i.e., a line represents a possible path by which data messages can flow between nodes in network 100).

Each transmitting node (e.g., a router) has some limit to its radio range, infrared range or other range associated with the particular wireless communication medium that it is using to communicate with other nodes. The dashed circle in FIG. 1 illustrates an exemplary RF range associated with node 110. It should be understood, however, that the range of a node typically has an irregular shape and depends on factors such as the terrain, reflections from nearby buildings and vehicles, other wireless interference and so forth.

FIG. 1 shows node 110 with neighbor nodes 120, 130 and 140. That is, node 110 has formed neighbor relations with nodes 120–140. Node 110 also has a number of other potential neighbors, labeled P1, P2 and P3. These potential neighbors are nodes that are within node 110's RF range. These potential neighbors could be used for forwarding messages, but are not currently being used as such. For example, if a node in an existing path fails, node 110 may establish a neighbor relationship with one or more of the potential neighbors P1–P3 to route data messages via an alternate path.

Exemplary Node

Figure 2:
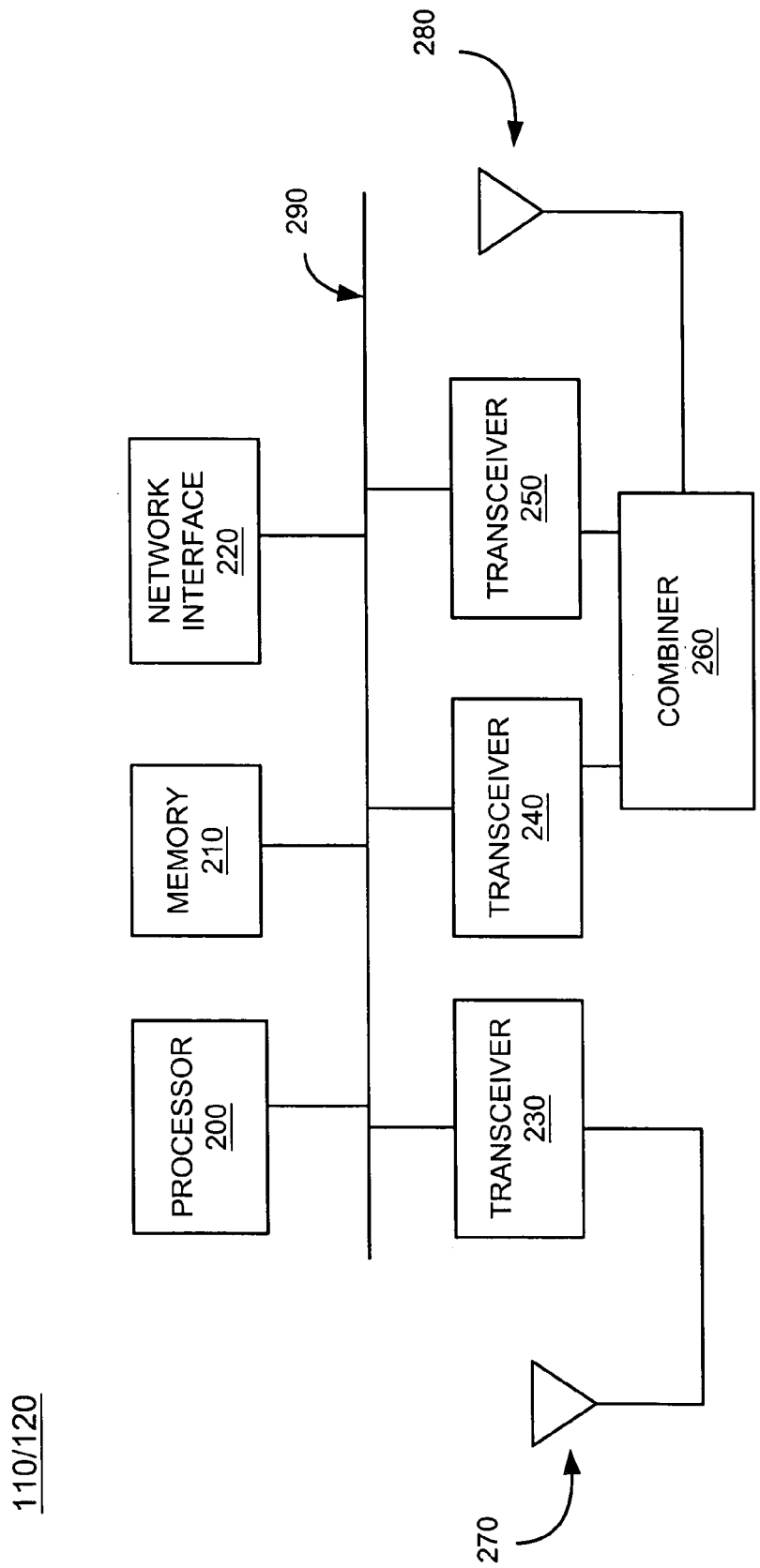
FIG. 2 is a diagram of an exemplary node of FIG. 1 according to an implementation consistent with the present invention.

FIG. 2 is a diagram of an exemplary node of FIG. 1, such as node 110 or node 120, according to an implementation consistent with the present invention. The node 110/120 may include a processor 200, a memory 210, a network interface 220, transceiver modules 230, 240 and 250, a combiner 260 and antennas 270 and 280. These components may be connected via one or more buses, illustrated as bus 290 for simplicity. Nodes 130 and 140 may be similarly configured.

One skilled in the art would recognize that nodes 110 and 120 may be configured in a number of other ways and may include other elements. For example, the node 110/120 may include a different number of antennas and transceiver modules. In addition, the node 110/120 may include a power supply, such as a battery, fuel cell, or the like, for providing power to the components of the node 110/120. In some implementations, the power supply includes a recharging mechanism to permit the battery to be recharged using, for example, solar power techniques.

The processor 200 may include any type of conventional processor or microprocessor that interprets and executes instructions. The memory 210 may include a conventional random access memory (RAM) or another type of dynamic storage device that stores information and instructions for execution by the processor 200. The memory 210 may also include a conventional read only memory (ROM) device or another type of static storage device that stores static information and instructions for use by the processor 200. Instructions used by the processor 200 may also, or alternatively, be stored in another type of computer-readable medium. A computer-readable medium includes one or more memory devices and/or carrier waves.

The network interface 220 may include an interface that allows the node to be coupled to an external network. For example, the network interface 220 may include a serial line interface, an Ethernet interface, an asynchronous transfer mode (ATM) network interface, an interface to a local area network (LAN), etc.

The transceiver module 230 may include conventional components for transmitting and receiving data. For example, transceiver module 230 may include conventional transceiver circuitry for transmitting and receiving RF data via antenna 270. The transceiver module 230 may also include a conventional modem that that converts analog signals to digital signals, and vice versa, for communicating with other devices in node 110/120. In other implementations, the transceiver module 230 may be configured as separate transmit and receive modules and a separate modem. Transceiver modules 240 and 250 may include similar components as transceiver module 230.

The combiner 260 may include conventional circuitry that receives information from transceiver modules 240 and 250 and forwards the information for transmission to antenna 280. The combiner 260 may also receive information from antenna 280 and forward the information to either transceiver module 240 or 250.

The RF antennas 270 and 280 may each include a conventional antenna capable of transmitting and receiving RF signals. In accordance with an exemplary implementation, antenna 270 may be an omni-directional antenna that may be used for beaconing and antenna 280 may be a directional antenna that may be used for transmitting/receiving data messages after neighbor nodes have been detected.

Each of nodes 110 and 120, consistent with the present invention, perform neighbor discovery in response to its respective processor 200 executing sequences of instructions contained in a computer-readable medium, such as memory 210. Such instructions may be read into memory 210 from another computer-readable medium, such as an external data storage device (not shown).

Execution of the sequences of instructions causes processor 200 to perform the acts that will be described hereafter. In alternative embodiments, hard-wired circuitry may be used in place of or in combination with software instructions to implement aspects of the present invention. For example, in alternative embodiments, the processor 200 may be implemented as an application specific integrated circuit (ASIC), a number of field programmable gate arrays (FPGAs) or one or more digital signal processors (DSPs). Thus, the present invention is not limited to any specific combination of hardware circuitry and software.

Exemplary Processing

Figure 3:
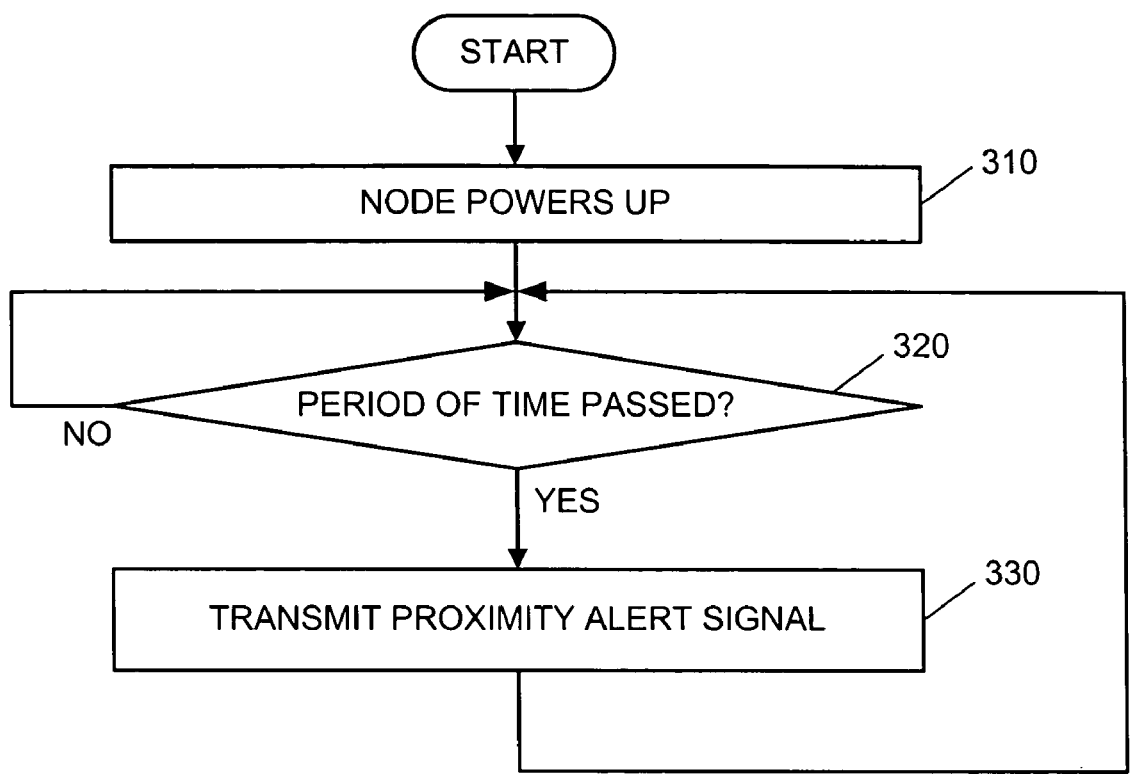
FIGS. 3–5 are flow diagrams that illustrate exemplary processing by nodes in the network of FIG. 1 in an implementation consistent with the present invention.
Figure 4:
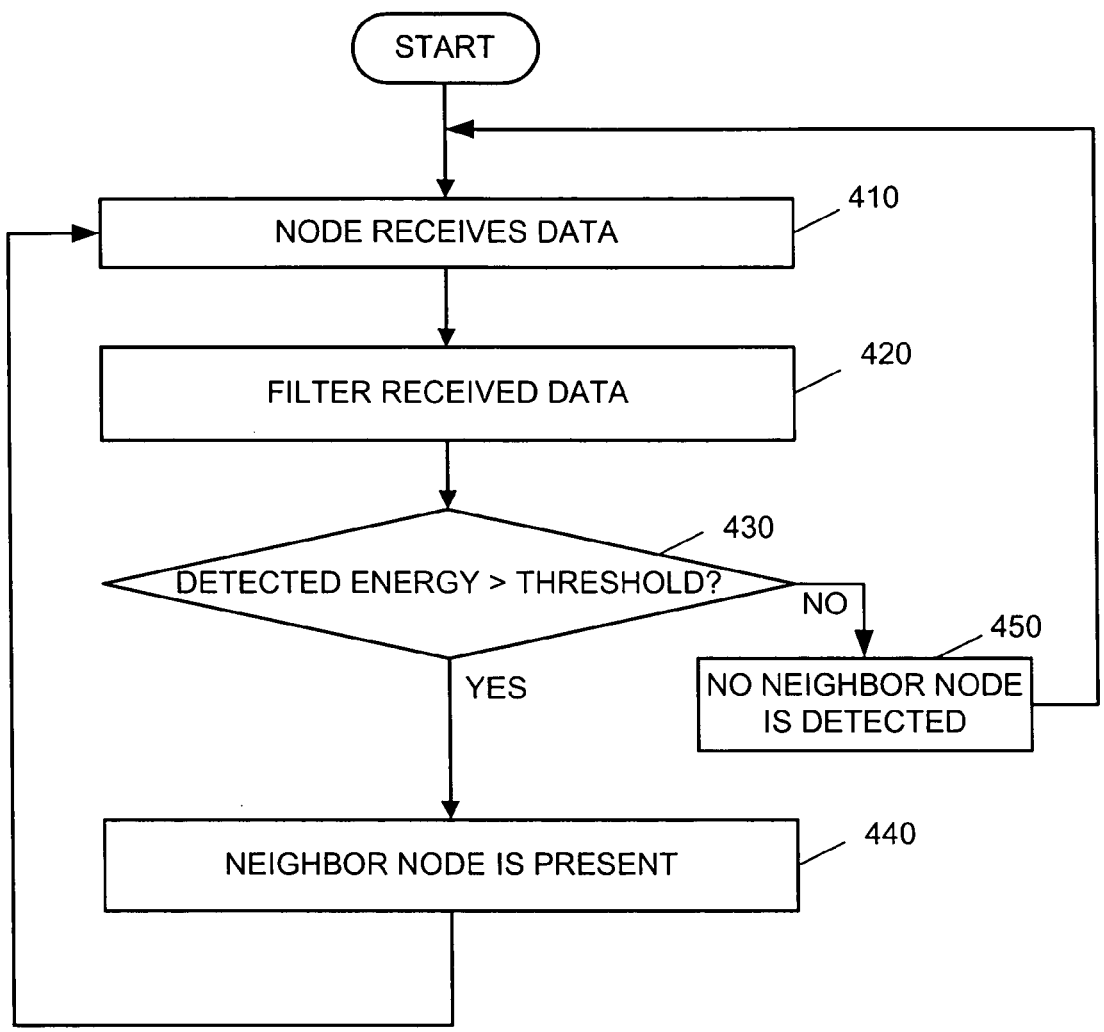
Figure 5:
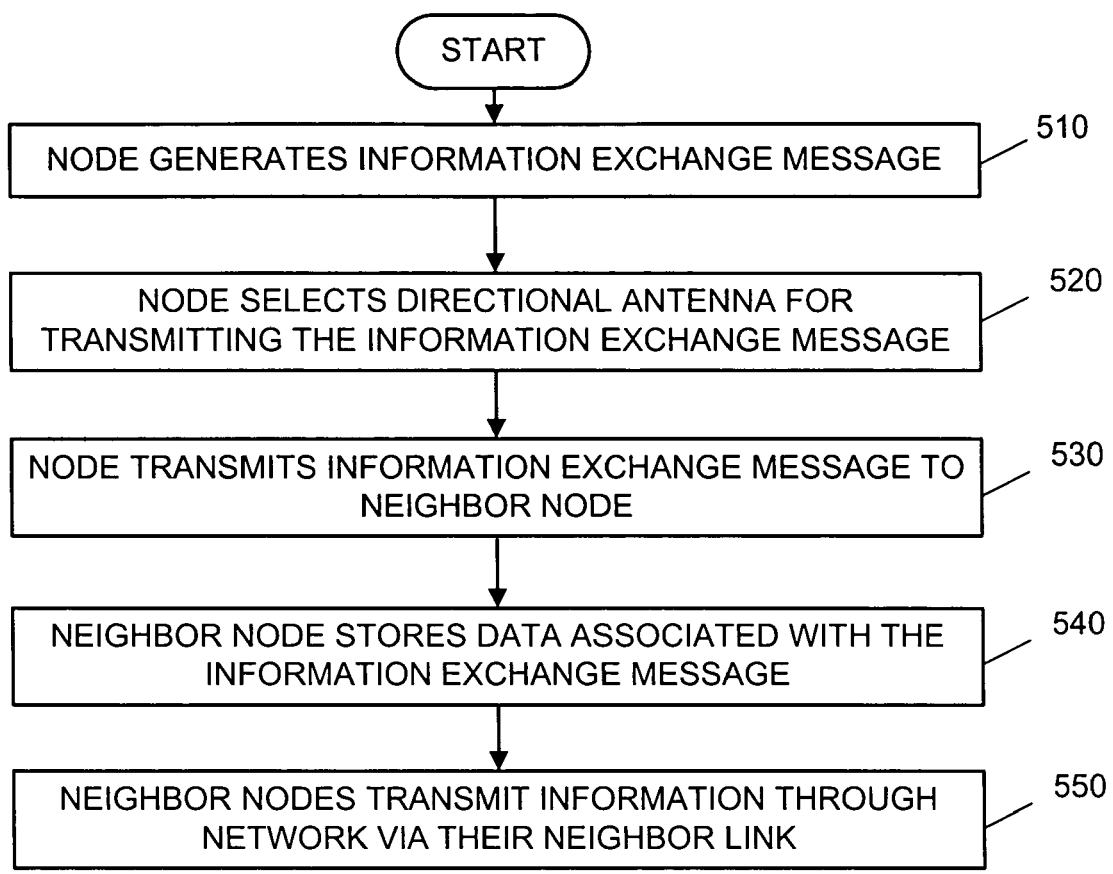

FIGS. 3–5 are flow diagrams of processing by nodes in network 100 in an exemplary implementation consistent with the present invention. Processing begins when node 110 powers up (act 310). As described previously, nodes in a wireless network, such as network 100, perform neighbor discovery to detect their neighboring nodes. According to an implementation consistent with the present invention, the neighbor discovery function may be split into two sub-functions: 1) a "proximity alert" function with LPD, and 2) an "exchange of information" function.

Assume that node 110 uses one of its transceiver modules and antennas primarily for the proximity alert function and the other transceiver modules/antenna for the exchange of information function and for normal data transmissions associated with transmitting data packets between nodes. For example, assume that transceiver module 230 and antenna 270 are used to transmit the proximity alert and that transceiver modules 240 and 250 and antenna 280 are used to transmit data packets after a neighboring node has been detected. In this implementation, antenna 270 may be an omni-directional antenna that transmits the proximity alert signal in all directions. Alternatively, antenna 270 may include a set of sectored antennas. In this case, node 110 may transmit the proximity alert signal on each directional antenna in the set of antennas so that the signal will be transmitted in all directions.

After the node 110 powers up, the node 110 may wait some amount of time before transmitting a proximity alert signal (act 320). In one implementation consistent with the present invention, the amount of time may be zero. In other words, the node 110 may continuously transmit proximity alert signals. In other implementations consistent with the present invention, the period of time may be a fixed interval, a random or pseudorandom interval, a combination of fixed and random or pseudorandom intervals, etc. Altering the interval in this manner makes it more difficult for an unintended receiver to detect the proximity alert signal.

After the amount of time has passed, the node 10 may transmit a unique "proximity" spreading sequence via transceiver module 230 and antenna 270 (act 330). According to an exemplary implementation consistent with the present invention, each node in network 100 may be assigned a unique spreading sequence. The spreading sequence may be implemented as a direct sequence or a frequency hopping sequence and may be relatively long. Alternatively, the spreading sequence may be implemented using other techniques, such as with short pulses employed in ultra-wide-band (UWB) radio technology.

For example, in a direct sequence system, a data signal is "spread" by multiplying the data signal by a binary sequence of chips (i.e., pulses), often referred to as a pseudo-noise code (PN code). The sequence or PN code typically spreads the data signal well beyond the bandwidth needed to transmit the actual data signal.

Alternatively, in a frequency hopping system, a data signal may "hop" (i.e., be divided) over a number of frequencies within a spreading bandwidth. The spreading sequence may be a slow frequency hopping (SFH) sequence (i.e., one or more data bits are transmitted within one frequency hop) or a fast frequency hopping (FFH) sequence (i.e., one data bit is divided over a number of frequency hops). In either case, SFH or FFH, the frequency hopping sequence effectively spreads the signal over the spreading bandwidth.

In implementations employing UWB technology, a data signal may be transmitted using a series of short, precisely timed pulses. The narrower the pulses, the more widely spread the signal, which may reduce the potential for interference.

The present invention advantageously uses the unique spreading sequence (e.g., a direct sequence, a frequency hopping sequence or short pulses in accordance with UWB techniques), as a proximity alert or beaconing signal to other nodes in the network. The unique spreading sequence for each node may be stored in the memory of the particular node, such as memory 210 of node 110.

The node 110, consistent with the present invention, may transmit the spreading sequence at a low power level via antenna 270. The particular power level may be based on the configuration of the nodes in network 100. For example, when the nodes in network 100 are spaced far apart, the power level may be higher than when the nodes in network 100 are deployed fairly close to each other. Other factors that may affect the power levels employed include node mobility, the number of nodes nearby, etc. One of ordinary skill in the art would be able to optimize the power level with which node 110 transmits the spreading sequence to ensure that an intended receiver is able to receive the proximity alert signal, while making it extremely difficult for an unintended receiver to pick out the signal from the noise. For example, transmitting the spreading sequence (i.e., the proximity alert signal) at low power makes it difficult for an unintended receiver to detect the signal because the transmitted power spectral density is extremely low, even with moderate received signal-to-noise ratios in the intended receiver's detection (decision) bandwidth.

In addition, in each case (i.e., direct sequence, frequency hopping or UWB techniques), the spreading sequence employed may also be chosen to suppress signature features in the waveform used, thereby further reducing the chances of unintended detection. For example, each type of PN code, such as M-sequences, Gold codes, Kasami codes, etc., and each type of frequency hopping sequence, such as SFH, FFH, etc., has its own particular characteristics. One of ordinary skill in the art would be able to select the spreading sequence, such as the type of sequence, the length of the sequence, etc, to suppress signature features of the waveform used. This may force an unintended receiver to use radiometric techniques and long integration times in order to attempt to detect the transmissions, thereby making unintended detection of the proximity alert signals much more difficult.

After transmitting the spreading sequence, processing returns to act 320 and the process is repeated. That is, the node 10 continues to transmit the spreading sequence (i.e., the proximity alert signal) at the appropriate times to detect neighboring nodes. In an exemplary implementation of the invention, node 10 may adjust the power level with which the proximity alert signal is transmitted when it is unable to form any neighbor relations. For example, if after a number of proximity alert signals have been transmitted and node 10 has received no "exchange of information" messages from other nodes, as described in more detail below, node 10 may increase the power level with which it transmits the proximity alert signal.

Assume that another node, such as node 120, is attempting to receive proximity alert signals, i.e., the spreading sequence, from nodes in network 100, such as node 10. In an exemplary implementation, each node in network 100 includes a matched filter designed to detect the spreading code used by one or more other transmitting nodes in network 100.

For example, in an exemplary implementation, node 120 may include a filter that is designed to detect the spreading code or sequence used by node 110 to spread the signal. By using a matched filter, very long integration times (also interpreted as narrow bandwidths in the frequency domain) enable very high process gains. These process gains, however, are only available to receivers or nodes that know the spreading code or sequence. The process gain is commonly known as the ratio of the baud or symbol rate to the chipping rate in direct sequence systems. That is, the process gain is a power ratio and may also be interpreted as the effective loss to an unintended receiver. For example, if the intended receiver integrates its output for 100 seconds to generate a decision and the chipping rate is at 10 million chips-per-second, the process gain is said to be 90 decibels (dB). The receiving node may use this processing gain to detect neighbor nodes, as described in more detail below.

Assume that node 120 receives data for some amount of time (FIG. 4, act 410). For example, node 120 may receive data for a fixed interval, a fixed interval on a schedule, etc. The node 120 may filter the received data, either during or after the receiving period, using a filter that is matched to detect the transmitted waveform associated with the proximity alert signal (act 420). For example, as discussed previously, the node 120 may include a filter that is designed to detect the spreading code used by the respective transmitters of other nodes in network 100, such as node 110.

After filtering the received data, the node 120 may calculate the energy associated with the filtered signal (i.e., from the matched filter) and compare the detected energy to a threshold (act 430). When the detected energy exceeds the threshold, this indicates the presence of a neighboring transmitter (i.e., a neighbor node) (act 440). The total received energy may provide an indication of the path loss between the transmitter and the receiver (i.e., between node 110 and node 120). When the detected energy does not exceed the threshold, node 120 has not detected a neighbor node and the filtered data may be associated with noise (act 450). In either case (i.e., a neighbor node was detected or not detected), processing may return to act 410 where node 120 continues to attempt to receive data and detect neighbor nodes. As described previously, the nodes in network 100 may form neighbor relations with a number of nodes. Therefore, even if one neighbor node has been detected, the node 120 may continue to attempt to detect other neighbor nodes so that alternate paths will be available for transmitting data in case one or more nodes fail.

As discussed previously, only receivers that know the spreading code or sequence used to transmit the proximity alert signal are able to take advantage of the large processing gains needed to detect the proximity alert signal. As a result, unintended receivers will not be able to detect the proximity alert signals from among other signals/noise. In addition, even if an unintended receiver is able to guess at parameters of the spreading code used to transmit the proximity alert signal, the nodes in network 100 may change parameters in the spreading code to counteract this threat. For example, a node, such as node 110, may change the parameters in the spreading code at various times (e.g., at predetermined, random or pseudorandom intervals) or may change the parameters in the spreading code used to transmit between various nodes in the network 100 (e.g., in a predetermined, random or pseudorandom manner) to limit the ability of an adversary to exploit a successful detection of a spreading code. In each case, however, the codes actually used are known to the intended receivers so that theses nodes can detect their neighbor nodes.

Assume that the detected energy exceeded the threshold (FIG. 4, act 440; i.e., a neighbor node was detected), node 120 may store information in a routing table indicating that node 110 is a new potential neighbor that has been detected. The stored information may also indicate the node's identity, as discussed below. Node 120 may also formulate a message containing "information exchange" data (FIG. 5, act 510). The information exchange data may include an identification of the node that is transmitting the message, forward error correction data, and other fields depending on the type of wireless network protocols being employed.

In an exemplary implementation, the node 120 may use a directional antenna to communicate with the newly detected neighbor node 110 (act 520). For example, assume antenna 280 of node 120 includes a sectored set of antennas similar to those employed in a cellular base station. In this case, when node 120 detects the proximity alert signal, node 120 determines which antenna in the sectored set of antennas received the proximity alert signal with the highest signal-to-noise ratio. The node 120 may choose this particular directional antenna as the antenna to be used for communicating with the newly detected node 110.

Alternatively, node 120 may include separate sets of antennas for the proximity alert and information exchange messages because these messages may occur in different radio bands. In this case, node 120 may select the antenna(s) in the set of antennas designated for transmitting the information exchange messages that is aligned in the same direction as the best receiving antenna (i.e., the antenna with the highest received signal-to-noise ratio associated with the proximity alert signal).

In still another alternative, node 120 may be able to position its antennas in any direction. In this case, node 120 may aim a directional antenna in the direction as the best receiving antenna, if no transmitting antenna is already aligned in the same direction as the best receiving antenna. In yet other implementations, node 120 may include only an omni-directional antenna(s) and act 520 may be bypassed.

In any event, node 120 may transmit the information exchange message to node 110 (act 530). Node 120, consistent with the present invention, may select a "global" spreading code for the information exchange messages. That is, node 120 may transmit the information exchange message using a common spreading code or sequence that may be shared by all the nodes in network 100. In implementations employing UWB technology, node 120 may transmit the information exchange message using a series of short pulses. In this case, the other nodes, such as node 110, may be configured to detect the particular series of pulses used by other nodes, such as node 120, in network 100.

Alternatively, node 120 may transmit the information exchange message to node 110 using a unique spreading code or sequence that has been assigned to node 110 (i.e., the node it just detected). For example, the spreading code used to transmit messages to node 110 may be different than the spreading code used to transmit messages to another node, such as node 130. This may be accomplished in a number of ways.

For example, in one implementation, node 120 may determine the identity of the proximate node (i.e., node 110), by correlating the unique proximity alert signal to the particular node that transmitted the proximity alert signal. That is, the node 120 may remove the spreading code to de-spread the proximity alert signal and may demodulate the de-spread signal to recover information that identifies the transmitting node (i.e., node 110).

The node 120 may then access a table located, for example, in memory 210 that correlates each node in network 100 with a unique spreading code to be used for transmissions to that node. Sending the information exchange message on a unique, per-recipient code may provide a higher degree of security than sending it on a spreading code that is shared among all the nodes in network 100.

Node 110 receives the information exchange message from node 120. Node 110 may then decode the information exchange message and store information associated with node 120 (act 540). For example, node 110 may store information in a routing table indicating that node 120 is a neighbor node. This means that node 110 may use node 120 as a next hop for routing data through network 100. Node 120, as discussed previously, may store similar information in its memory indicating that node 110 may be used as a next hop for data transmissions through network 100. The nodes 110 and 120 may also pass other information between themselves to establish the neighbor link, based on the particular type(s) of wireless protocols being employed.

As a result, nodes 110 and 120 may transmit data packets to each other and to other nodes in network 100 using the neighbor link they have established (act 550). For example, data packets from node 120 may be forwarded to a destination, such as node 130, via node 110. In a similar manner, the neighbor link between nodes 10 and 120 may be used to transmit other data packets to their ultimate destinations.

Systems and methods consistent with the present invention transmit proximity alert signals with a low probability of detection using spreading sequences. As a result, unintended receivers are unable to detect the proximity alert signals without knowing the spreading sequence. In addition, the proximity alert signals may be transmitted at non-regular intervals at low power levels, thereby further reducing the likelihood of detection by an adversary.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while the network 100 has been described as an ad hoc wireless network, systems and methods consistent with the present invention may be applicable to other types of networks. In addition, while a series of acts has been described with respect to FIGS. 3–5, the order of the acts may be modified in other implementations consistent with the present invention.

The present invention has also been described as using a unique spreading sequence per node associated with transmitting the proximity alert signals. In other implementations, all nodes in network 100 may share the same spreading sequence or some of the nodes may share the same spreading sequence.

The present invention has further been described as transmitting signals using either a direct sequence, a frequency hopping sequence or UWB techniques. In other implementations, a combination of direct sequences, frequency hopping sequences and UWB techniques may be employed to transmit the proximity alert signals. In these cases, the transmitting and receiving nodes are coordinated so that they are able to identify the sequences or techniques being employed to transmit the proximity alert signals.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. In a wireless network including a plurality of nodes, a method of performing neighbor discovery, the method comprising:
    generating a signal at a first node for alerting other nodes in the network of the presence of the first node, the signal comprising a spread signal;
    broadcasting the signal from the first node, the broadcasted signal having a low probability of detection by an unintended receiver,
    receiving the signal at a second node;
    filtering the received signal at the second node using a filter matched to a spreading sequence or code used to spread the signal;
    calculating an energy associated with the filtered signal;
    establishing a threshold;
    determining whether the energy is greater than the threshold;
    identifying, by the second node, the first node as a neighbor node when the energy is greater than the threshold;
    transmitting a message from the second node to the first node, the message comprising information identifying the second node;
    repeating the broadcasting of the signal from the first node;
    adjusting a power level associated with broadcasting the signal based on whether the message from the second node has been received by the first node; and
    changing, by the first node, the spreading sequence or code used to spread the signal after a number of broadcasts.

2. The method of claim 1, further comprising:
    identifying a spreading code to be used for transmissions from the second node to the first node, and
    wherein the transmitting comprises:
        transmitting the message using the identified spreading code.

3. The method of claim 1, wherein the transmitting includes:
    identifying a directional antenna to be used for transmitting the message, and
    transmitting the message using the identified directional antenna.

4. The method of claim 1, further comprising:
    de-spreading the signal by the second node using a spreading code associated with the signal; and
    determining the identity of the first node from the de-spread signal.

5. The method of claim 1, wherein the spread signal is spread using at least one of a frequency hopping sequence, a direct sequence or a number of short pulses in accordance with ultra-wideband radio technology.

6. The method of claim 1, wherein the broadcasting includes at least one of:
    broadcasting the signal at random or pseudorandom intervals, or
    broadcasting the signal using a combination of regular and random or pseudorandom intervals.

7. In a network comprising a plurality of nodes, a first node comprising:
   an omni-directional antenna;
   a directional antenna;
   a processor configured to generate a spreading sequence that identifies the first node;
   a first transmitter configured to broadcast the spreading sequence using the omni-directional antenna;
   a receiver configured to receive a message from a second node, the message identifying the second node and indicating that the second node is a neighbor node; and
   a second transmitter configured to transmit data to the second node using the directional antenna after the message from the second node is received,
   the first transmitter being further configured to:
   repeat the broadcast of the spreading sequence, and
   adjust a power level associated with broadcasting the spreading sequence based on whether the message from the second node has been received, and
   the processor being further configured to:
   change the spreading sequence after a number of broadcasts.

8. The first node of claim 5, wherein the transmitter is further configured to at least one of:
   broadcast the spreading sequence at random intervals, pseudorandom intervals or a combination of regular and random or pseudorandom intervals.

9. The first node of claim 5, wherein the processor is further configured to:
   generate at least a second spreading sequence that identifies the first node, wherein the transmitter is configured to broadcast the second spreading sequence at random or pseudorandom intervals.

10. The first node of claim 5, wherein the first transmitter is configured to:
    broadcast the spreading sequence using at least one of a frequency hopping sequence, a direct sequence or a number of relatively short pulses.

11. A computer-readable medium having stored thereon a plurality of computer executable instructions, said instructions including sequences of instructions which, when executed by a computer, cause said computer to:
    retrieve a spreading sequence that identifies a first node in a wireless network;
    broadcast the spreading sequence using an omni-directional antenna, the spreading sequence having a low probability of detection by an unintended receiver;
    receive a message from a second node in the wireless network, the message identifying the second node and indicating that the second node is a neighbor node;
    transmit data packets to the second node using a directional antenna after the message from the second node is received;
    repeat the broadcast of the spreading sequence a number of times;
    adjust a power level associated with broadcasting the spreading sequence based on whether the message from the second node has been received; and
    change the spreading sequence after a number of broadcasts.

12. The computer-readable medium of claim 9, including instructions for causing said computer to at least one of:
    broadcast the spreading sequence at random or pseudorandom intervals or broadcast the spreading sequence at a combination of regular and random or pseudorandom intervals.

13. The computer-readable medium of claim 9, wherein the instructions for causing the computer to change the spreading sequence include instructions for causing said computer to:
    retrieve at least a second spreading sequence that identifies the first node; and
    broadcast the second spreading sequence random or pseudorandom intervals.

14. The computer-readable medium of claim 9, wherein the spreading sequence comprises at least one of a frequency hopping sequence, a direct sequence or a number of relatively short pulses.

15. A system for performing neighbor discovery in a wireless network, comprising:
    means for generating a signal at a first node for alerting other nodes in the network of the presence of the first node, the signal comprising a spread signal;
    means for broadcasting the signal from the first node using an omni-directional antenna or a set of sectored antennas;
    means for receiving the signal at a second node;
    means for filtering the received signal at the second node using a filter matched to a spreading sequence or code used to spread the signal;
    means for calculating an energy associated with the filtered signal;
    means for determining whether the energy is greater than a threshold;
    means for identifying, by the second node, the first node as a neighbor node when the energy is greater than the threshold;
    means for transmitting a message from the second node to the first node using a directional antenna, the message comprising information identifying the second node;
    means for repeating the broadcasting of the signal from the first node a number of times;
    means for adjusting a power level associated with broadcasting the signal based on whether the message from the second node has been received; and
    means for changing a spreading sequence used to spread the signal after a number of broadcasts.

16. In a network including a plurality of nodes, a method of performing neighbor discovery, the method comprising:
    broadcasting a spreading sequence from at least a first node in the network using an omni-directional antenna, the spreading sequence having a low probability of detection by an unintended receiver and being used to alert other nodes in the network of the presence of the first node;
    detecting, by at least a second node in the network, the first node using a filter matched to detect the spreading sequence used by the first node;
    identifying, by the second node, the first node as a neighbor;
    selecting, by the second node, a directional antenna;
    transmitting a message from the second node to the first node using the directional antenna, the message comprising information identifying the second node;
    broadcasting the spreading sequence a number of times;
    adjusting the power level associated with the broadcasting based on whether a reply message, indicating that at least the second node has detected the spreading sequence, has been received by the first node; and
    changing the spreading sequence after a number of broadcasts.

17. The method of claim 13, further comprising:

determining a spreading code to be used for transmissions from the second node to the first node; and wherein the transmitting a message comprises:

transmitting the message using the determined spreading code.

18. A first node in a wireless network comprising:

an omni-directional antenna;

a directional antenna;

a transmitter configured to transmit a signal for alerting other nodes in the network of the presence of the first node via the omni-directional antenna, the signal comprising a spread signal that is spread using at least one of a direct sequence, a frequency hopping sequence or a number of short pulses; and a receiver configured to receive a message from a second node in the network, the message identifying the second node as a neighbor node and being sent in response to the second node detecting the signal from the first node, and wherein the transmitter is further configured to:

repeat the transmission of the signal, adjust a power level at which the signal is transmitted based on whether the message from the second node has been received, and transmit data packets to the second node using the directional antenna after a neighbor relationship with the second node has been established, the first node further comprising:

a processor configured to change a spreading sequence or code used to spread the signal after a number of transmissions.

\* \* \* \* \*

UNITED STATES PATENT AND TRADEMARK OFFICE
CERTIFICATE OF CORRECTION

| | |
|---|---|
| PATENT NO. | : 7,269,198 B1 |
| APPLICATION NO. | : 10/022083 |
| DATED | : September 11, 2007 |
| INVENTOR(S) | : Elliott et al. |

It is certified that error appears in the above-identified patent and that said Letters Patent is hereby corrected as shown below:

In Claim 8, Column 11, line 23, please replace "claim 5" to read --claim 7--.
In Claim 9, Column 11, line 28, please replace "claim 5" to read --claim 7--.
In Claim 10, Column 11, line 34, please replace "claim 5" to read --claim 7--.
In Claim 12, Column 11, line 62, please replace "claim 9" to read --claim 11--.
In Claim 13, Column 12, line 1, please replace "claim 9" to read --claim 11--.
In Claim 14, Column 12, line 9, please replace "claim 9" to read --claim 11--.
In Claim 17, Column 13, line 1, please replace "claim 13" to read --claim 16--.

Signed and Sealed this

Seventeenth Day of June, 2008

JON W. DUDAS
*Director of the United States Patent and Trademark Office*